March 18, 1941.   T. F. KRUMM   2,235,321
CAMBER AND CASTER GAUGE
Filed May 22, 1940   2 Sheets-Sheet 2
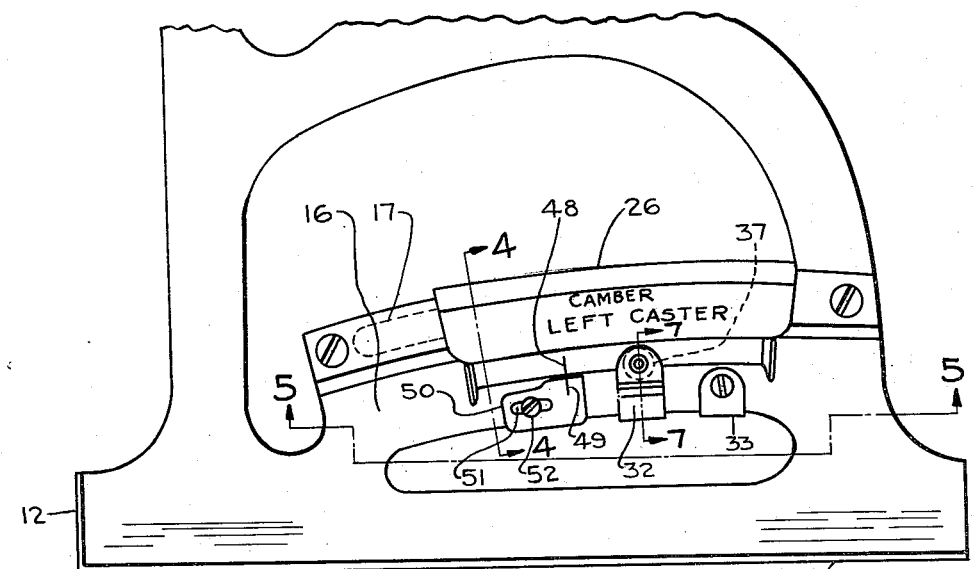
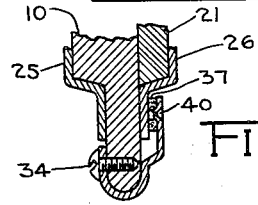
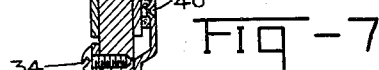
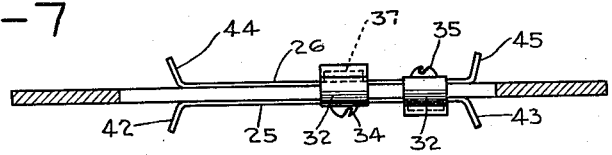
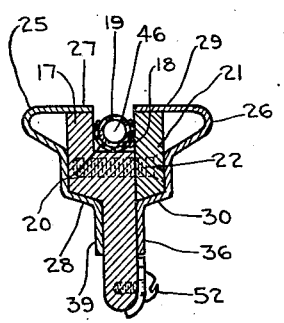
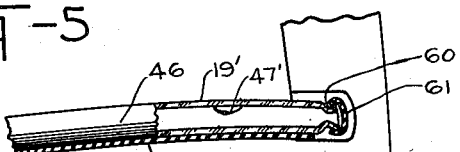
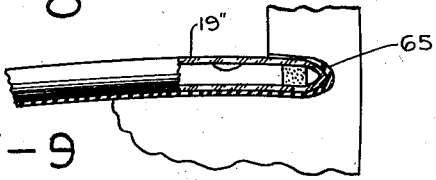
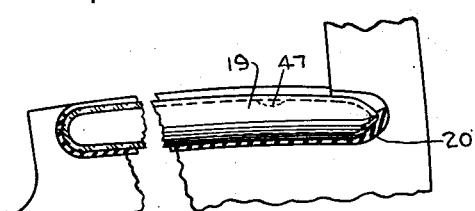
Inventor
Thomas F. Krumm
By Braselton, Whitcomb & Davies
Attorney Patented Mar. 18, 1941

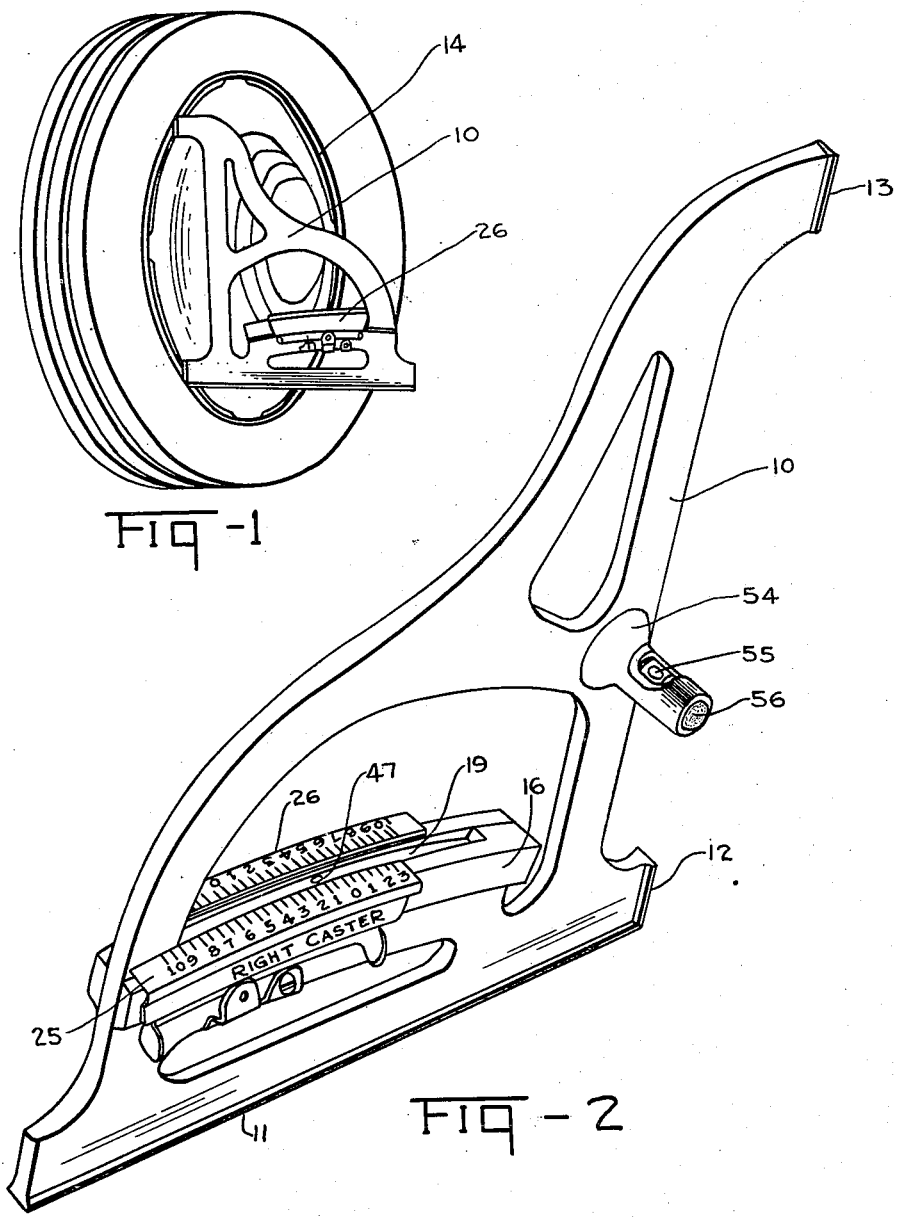

2,235,321

UNITED STATES PATENT OFFICE 2,235,321

CAMBER AND CASTER GAUGE

Thomas F. Krumm, Toledo, Ohio

Application May 22, 1940, Serial No. 336,616

9 Claims. (Cl. 33—203)

My invention relates to gauges and more particularly to gauges of a character for determining alignment of the steering or dirigible wheels of a vehicle.

My invention has for an object the provision of a gauge for quickly and easily determining both the condition of camber and caster of the steerable wheels of the vehicle.

The invention is inclusive of a simple light weight gauge for determining both camber and caster of dirigible vehicle wheels in which the conditions of camber and caster may be directly indicated by suitable calibrated scales.

A further object of the invention is the provision of a gauge for determining caster or dirigible wheels providing calibrated scales independently adjustable for determining caster of both right and left wheels of vehicles of any make or type.

Still a further object of the invention resides in the provision of a gauge of this character which may be brought in direct contact with the vehicle wheel and a direct reading of camber and caster obtained through the means of calibrated scales forming a part of the gauge structure.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which Figure 1 is an elevational view illustrating the application of the gauge of my invention in contact with the felloe of a vehicle wheel to be tested for alignment;

Figure 2 is a perspective view of the gauge of my invention;

Figure 3 is an elevational view showing the lower portion of the gauge of my invention;

Figure 4 is a sectional view taken substantially on the line 4—4 of Figure 3;

Figure 5 is a sectional view taken substantially on the line 5—5 of Figure 3;

Figure 6 is a fragmentary sectional view illustrating a mounting for the gauge glass forming an element of my invention;

Figure 7 is a detail sectional view taken substantially on the line 7—7 of Figure 3;

Figure 8 is a fragmentary sectional view illustrating a modified form of gauge glass or spirit level construction;

Figure 9 is a view similar to Figure 7 showing another form of gauge glass construction.

While the arrangement of my invention has particular adaptability for determining dirigible wheel alignment in condition, it is to be understood that I contemplate the use of the gauge wherever the use of the same may be found to have utility.

The steerable or dirigible wheels of motor vehicles are usually mounted or inclined so that the front wheels are closer together at their point of contact with the road, this inclination being known as the camber of the wheel. Such wheels for steering purposes are movable about a king pin and the king pins supporting the stub axles for the wheels in the usual vehicle construction are inclined upwardly and rearwardly. This inclination of the king pin is known as caster. During the manufacture of automotive vehicles the dirigible or steerable wheels are adjusted at the factory for the correct camber and caster, but the proper adjustment of the wheels may be disturbed because of road shocks, collisions, and the like, and in numerous cases impairing the wheel position or alignment to an extent that the vehicle may not steer properly, tire wear increased abnormally, and the vehicle even tend to "shimmy" or "wander" as a result of improper alignment. As will be hereinafter explained, the gauge of my invention provides a simple and effective means for detecting error in the camber and caster of the steering wheels and at the same time indicating the extent of such errors.

Referring to the drawings in detail, I have provided a gauge frame or body 10 which is preferably formed of comparatively light weight material, as for example, aluminum, although any other material may be employed without departing from the invention. The frame 10 is provided with a horizontally extending plane surface portion 11 which terminates at one end in an upwardly extending uniplanar surface portion 12. The upper portion of the frame 10 terminates in a uniplanar pad-like portion 13 whose surface is in alignment with the surface of portion 12 so that said surfaces lie in a single plane. Extending across an open portion of the gauge frame 10 and integrally formed therewith is a bridge 16 which is formed with an arcuate bar-like portion 17. The portion 17 is provided with a longitudinally extending arcuate recess 18 for accommodating an arcuate shaped gauge glass or tube 19. The gauge glass 19 is mounted in a sheath 20 of rubber or other suitable shock absorbing material so that in event that the gauge is inadvertently dropped, the rubber will aid in preventing breakage of the gauge glass. The gauge glass 19 and its mounting 20 are held in place by means of an arcuately shaped bar 21 by means of screws 22 which are threaded into openings in the portion 17 of the gauge frame.

Mounted at each side of the gauge frame and carried respectively upon portion 17 and bar 21 are slidable members or indicators 25 and 26 which are preferably made of sheet metal. The indicator 25 is provided with a laterally extending portion 27 which lies adjacent the upper arcuate surface of the bar-like portion 17, the slide 25 being provided with a portion 28 which engages the lower surface of portion 17. Indicator 26 is provided with a similarly shaped laterally extending portion 29 and a second portion 30 which respectively engage the upper and lower surfaces of the bar 21. Each slidable indicator is frictionally held in place by means of spring clips 32 and 33 which are secured to the bridge portion 16 by means of screws 34 and 35. Positioned between each clip and the vertical surface 36 and 37 of indicators 25 and 26 are the fibre discs 37 which bear against the indicators and frictionally hold the same in slidable engagement with the portion 17 and bar 21. The discs 37 are provided with central openings into which project annular flanges 40 formed on the clips 32 and 33 serving to position each disc with respect to its supporting clip.

Indicator 25 is provided at its ends with laterally extending ears 42 and 43 and indicator 26 is provided at its ends with laterally extending ears 44 and 45 which serve as manipulating means to effect a sliding of the indicators along portion 17 and bar 21. The slides remaining in adjusted position under the influence of the friction exerted by the spring clips 32 and 33 upon the fibre blocks or discs 37.

The upper arcuate surfaces 27 and 29 of the indicators 25 and 26 are respectively graduated to indicate degrees of tilt of a plane passing through the pad portions 12 and 13. The gauge glass 19 is substantially filled with a fluid 46 leaving only sufficient air space to provide a suitable bubble 47, the arrangement providing a spirit level for cooperation with the graduations on the slidable members 25 and 26. I have found that a solution of approximately 50% alcohol and 50% water is very satisfactory.

Referring particularly to Figure 2, it will be noted that the slide 25 designated "right caster" has its upper surface 27 calibrated or graduated to indicate degrees, the graduations extending from 0 to 10 in a left hand direction as viewed in Figure 2, and from 0 to 3 in a right hand direction. In actual practice, I have found that it is desirable to indicate the graduations from 0 to 10 in the right hand direction in black figures, and those extending from 0 to 3 in the right hand direction by red figures. The black figures indicate positive caster and the red figures negative caster.

In order to determine the proper zero position for camber indication of a vehicle wheel, the slide 26, as is illustrated in Figure 3, is provided with an indicia 48 which registers with an indicia 49 on an adjustable member 50. The member 50 is provided with a slot 51 through which passes a screw 52 which provides longitudinal adjustment of member 50 for properly adjusting the initial position of indicia 49 so that the position of the bubble 47 in the glass 19 will indicate the proper degree of inclination or camber of the front wheel on the face of the slide 26 when the latter is in the position with the indices 48 and 49 in registration.

In order to properly determine camber and caster it is necessary that the gauge frame be held in a vertical position when in contact with a vehicle wheel and in order to indicate such vertical position I have provided a projection 54 extending laterally from the frame 18 in which is contained a spirit level 55, the level being sealed in position in the hollow projection 54 by means of a cementitious material 56 such, for example, as calcined gypsum.

The operation of the device is as follows: When it is desired to ascertain the camber or the amount of wheel inclination with respect to a theoretical vertical line, the vehicle is placed on a level floor with the wheels in a "straight-ahead" position and the tires substantially evenly inflated. The camber indicating slide 26 is then adjusted through the medium of one of the projections 44 until the indices 48 and 49 are brought into registration. In this position with the pads 12 and 13 in a vertical position, or the surface 11 lying on a level horizontal support, the center of the bubble 47 in glass 19 will be in registration with the zero mark of the calibrations on slide 26. The contact points or pads 12 and 13 of the gauge are then placed against the felloe of a front wheel with the gauge in vertical position as ascertained by position of the bubble in the spirit level 55. The operator then notes the position of the bubble 47 with respect to the calibrations on the slide 26, and the calibration opposite the center of the bubble indicating the degrees of camber of the wheel being tested.

In utilizing the gauge for testing the caster, the wheels of the vehicle are first moved by means of the steering mechanism to the extreme "right" direction. In testing the left hand wheel as viewed from the vehicle operator's compartment, the gauge is placed against the forward portion of the felloe of this wheel as indicated in Figure 1. The "left caster" slide 26 is then adjusted until the zero mark on the slide 26 registers with the center of the bubble 47 in the glass 19. The wheel is then moved to the extreme "left" position with the gauge in the same relative position on the wheel. The bubble 47 will assume a new position in the glass 19 because of caster angularity and the calibration on the slide 26 in registration with the bubble indicates the number of degrees of caster for the left hand wheel.

In testing for the caster of the right hand wheel, the steerable wheels are moved by the steering mechanism to the extreme "right" direction with the gauge contacting the forward portion of the felloe of the right hand wheel in the same relative position as was utilized for testing the "left" wheel. The "right caster" slide 25 is then adjusted until the zero calibration on this slide is in registration with the center of the bubble 47. After this operation has been performed, the steering wheels of the vehicle are then moved to the extreme "left" and with the gauge in the same position on the wheel, the calibration on the slide 25 in registration with the bubble 47 indicates the number of degrees of caster of the right hand wheel.

It is to be understood that in the operation of the device, the gauge must be at all times held in a vertical position as indicated by the bubble in the spirit level 55, otherwise an erroneous reading of the position of the bubble 47 may result.

The uniplanar surface 11 of the gauge frame is arranged at right angles to a plane passing through the pad portions 12 and 13 and when the index 48 is in registration with the index 49, the center of the bubble in the spirit level 19 will be in registration with the zero mark on the slide 26. Thus surface 11 in combination with the spirit level may be used as a true level. This I have found very desirable when the floor upon which the vehicle is resting is out-of-level. When this condition is encountered the gauge is placed with the uniplanar surface 11 upon the floor and the indication of slide 26 in registration with the bubble 47 is noted. This indication will be equivalent to the pitch of the floor indicated in degrees upon the slide 26. Thus, in taking caster readings after determining the pitch of the floor which, for example, is indicated at 2° with the front end of the vehicle in the high position upon such floor. The caster reading is 4°, it is then only necessary to subtract the pitch of the floor, namely 2° from the apparent caster reading of 4°, the remainder 2° being the angle of actual caster.

In Figure 8 there is illustrated a modified arrangement of spirit level glass 19' containing fluid 46' of alcohol and water, the end of the glass terminating in an annular groove 60. Slipped over the end of the tube and resting in the annular groove 60 is a flexible cap 61 of rubber or other suitable flexible material, the purpose of this cap being to accommodate abnormal expansion and contraction of the fluid under severe variations in temperature. Thus when the gauge is placed in an extreme warm temperature the cap 61 will expand and provide a chamber within which the fluid may expand without appreciably changing the size of the bubble 47'. Although the gauge as described in Figures 2 through 6, inclusive, has a sealed glass 19 I have found that when used in normal temperatures the expansion and contraction do not appreciably affect the size of the bubble 47; but in certain parts of the country where the temperature range is of wide variation, under such conditions the flexible cap accommodates the expansion of the spirit level fluid without impairing the utility of the gauge.

In Figure 9, I have illustrated a form of gauge glass in which there is inserted in the mouth of the tube 19" a flexible member or stopper 65 of rubber or other suitable material. The member 65 provides a degree of resilience to accommodate expansion of the liquid and further if the gauge is dropped or is struck, the member 65 absorbs or cushions the inertia of the liquid in the gauge glass so as to prevent the end of the glass from being broken.

It is apparent that, within the scope of the invention, modifications and different arrangements may be made other than is herein disclosed, and the present disclosure is illustrative merely, the invention comprehending all variations thereof.

What I claim is:

1. A gauge of the character disclosed comprising, in combination; a frame arranged to engage spaced points on a vehicle wheel, said frame having a portion provided with an arcuately shaped recess; a tube substantially filled with liquid in said recess forming a spirit level indicator; resilient means supporting said tube; a removable bar for securing said tube in said frame; a member slidably mounted on said bar; means for securing said slidable member upon said bar; and an adjustable index carried by said frame for determining the initial position of said slidable member.

2. A gauge of the character disclosed comprising, in combination; a frame arranged to engage a vehicle wheel felloe, said frame having a portion provided with an arcuately shaped recess; a tube substantially filled with liquid in said recess forming an indicator; resilient means supporting said tube; removable means for securing said tube in said frame; a slidable member positioned adjacent said tube; friction means for retaining said slidable member in adjusted position; and an index carried by said frame for determining the initial position of said slidable member.

3. A gauge of the character disclosed comprising, in combination; a frame arranged to engage spaced points on a vehicle wheel, said frame having a portion provided with an arcuately shaped recess; a liquid spirit indicator mounted in said recess; resilient means supporting said indicator; clamping means for securing the spirit indicator in said frame; a member bearing a series of calibrations slidably mounted adjacent said spirit indicator; and friction means for retaining said slidable member in adjusted position.

4. A gauge of the character disclosed comprising, in combination; a frame arranged to engage spaced points on a vehicle wheel, said frame having a portion provided with an arcuately shaped recess; a tube substantially filled with liquid in said recess forming an indicator; resilient means supporting said tube; a removable bar for securing said tube in said frame; a pair of members arranged at each side of said tube, one of said members being slidably supported on the frame, the other of said members being slidably supported on said bar, said slidable members each having a series of calibrations for determining the caster angles of both right and left hand vehicle wheels.

5. A gauge comprising, in combination; a frame having contact means arranged to engage the felloe of the vehicle wheel; an arcuate recess in said frame; an arcuately shaped tube in said recess, said tube containing a liquid in an amount to present an air bubble in said tube; removable means for securing said tube in said recess; a slidable member bearing a series of calibrations carried by said frame and arranged adjacent said tube; friction means engageable with said slide for retaining the latter in adjusted position; an index on said slide; and an adjustable index carried by said frame for determining an initial position of said slidable member.

6. A gauge comprising, in combination; a frame having contact means arranged to engage the felloe of the vehicle wheel; an arcuate recess in said frame; an arcuately shaped gauge glass in said recess, said glass containing a liquid in an amount to present an air bubble in said tube; a flexible closure for one end of said glass; means for securing said tube in said recess; a slidable member arranged adjacent said gauge glass; and means engageable with said slidable member retaining the latter in adjusted position.

7. A gauge comprising, in combination; a frame having contact means arranged to engage a steerable vehicle wheel; an arcuate recess in said frame; an arcuately shaped gauge tube in said recess, said tube containing a liquid in an amount to present an air bubble in said tube; a shock absorbing member positioned in one end of said tube; means for securing said tube in said recess; a calibrated slide arranged adjacent said tube and longitudinally movable with respect thereto; and friction means engageable with said slide for retaining the latter in adjusted position.

8. A gauge of the character disclosed comprising, in combination; a frame arranged to engage spaced points on a vehicle wheel, said frame having a portion provided with an arcuately shaped recess; a transparent tube substantially filled with liquid forming an indicator; said tube being supported in rubber in said recess; a removable bar for securing said tube in said frame; a pair of members arranged at each side of said tube, one of said members being slidably supported on the frame, the other of said members being slidably supported on said bar, said slidable members each being independently slidable and having a series of calibrations for determining the caster angles of right and left vehicle wheels; friction means engageable with said slidable members for frictionally holding said members in adjusted position; one of said slidable members having an index; said frame having an adjustable index for determining the initial position of the indexed slidable member whereby the position of the bubble in said tube with respect to the graduations on said index slide indicates the camber of a vehicle wheel.

9. A gauge of the character disclosed comprising, in combination; a frame arranged to engage spaced points on a vehicle wheel, said frame having a portion provided with an arcuately shaped recess; a tube substantially filled with liquid in said recess forming a spirit indicator; resilient means supporting said tube; a removable bar for securing said tube in said frame; a pair of members arranged at each side of said tube, one of said members being slidably supported on the frame, the other of said members being slidably supported on said bar, said slidable members each having a series of calibrations for determining the caster angles of both right and left hand vehicle wheels; friction means secured to said frame and bearing against said slidable members for frictionally holding said members in adjusted position; one of said slidable members having an index; said frame having an adjustable index for determining the initial position of the indexed slidable member whereby the position of the bubble in said tube with respect to the graduations on said index slide indicates the camber of a vehicle wheel.

THOMAS F. KRUMM.